W. M. COSTON.
Cultivator Frame.
No. 167,226.          Patented Aug. 31, 1875.
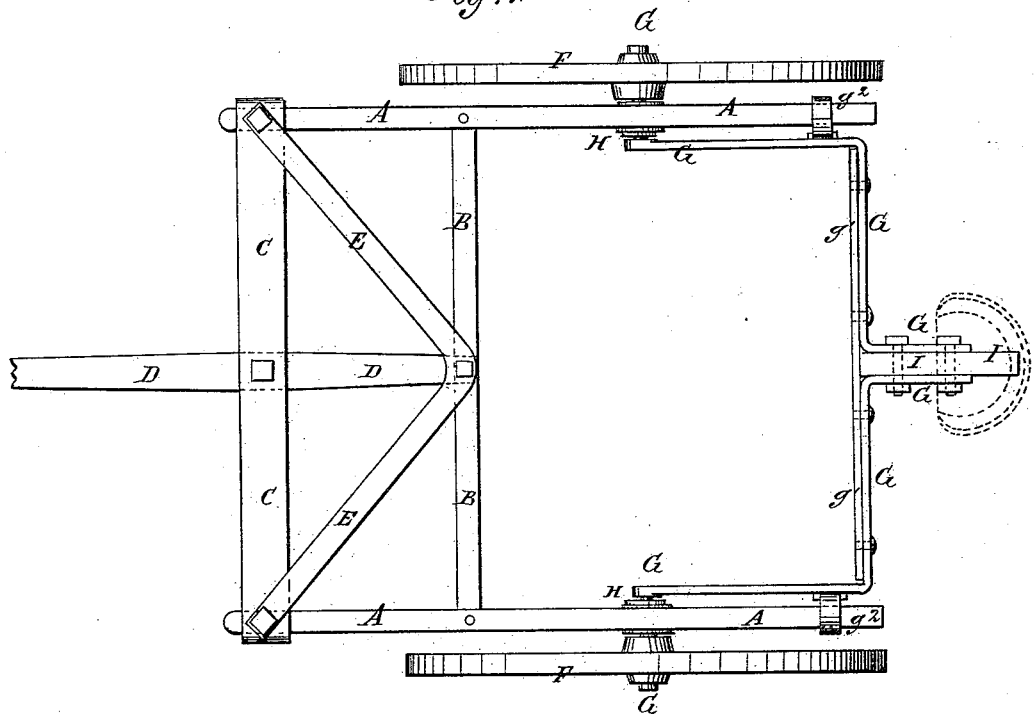
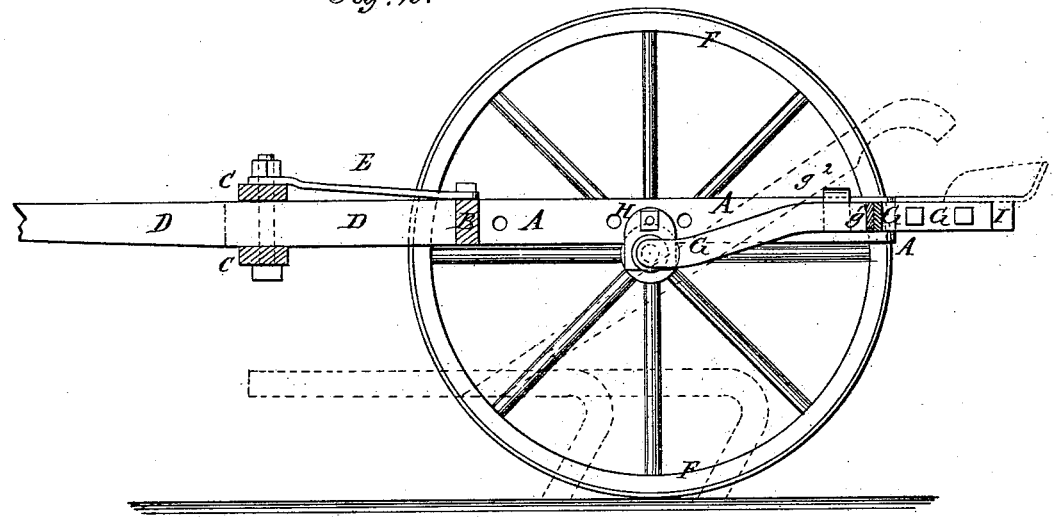
WITNESSES:          INVENTOR:

UNITED STATES PATENT OFFICE.

WILLIAM M. COSTON, OF QUITMAN, MISSOURI.

IMPROVEMENT IN CULTIVATOR-FRAMES.

Specification forming part of Letters Patent No. 167,226, dated August 31, 1875; application filed April 17, 1875.

*To all whom it may concern:*

Be it known that I, WILLIAM M. COSTON, of Quitman, in the county of Nodaway and State of Missouri, have invented a new and useful Improvement in Cultivator-Carriage Frame, of which the following is a specification:

Figure 1 is a top view of my improved cultivator-frame. Figure 2 is a vertical longitudinal section of the same.

Similar letters of reference indicate corresponding parts.

The object of this invention is to furnish an improved cultivator-frame, which shall be so constructed that the seat-support can be turned over forward, leaving the rear part of the frame wholly unobstructed, so that the machine can be used as a riding or walking cultivator, as desired. The invention consists in the combination of the adjustable bearings, and the compound axle provided with a bar to receive the seat, and with supporting-hooks with the perforated side bars, the cross-bars, the tongue, the braces, and the wheels, as hereinafter fully described.

A are the side bars of the frame, which are connected a little in front of their centers by a cross-bar, B, and at their forward ends by two cross-bars, C, attached to the upper and lower sides of said ends. D is the tongue, the rear end of which is secured to the center of the cross-bar B, and which passes between, and is secured to the centers of the two cross-bars C. The tongue D and the forward end of the frame are strengthened against side draft by the inclined braces E, the forward ends of which are secured to the forward corners of the frame A B C, and their rear ends are secured to the cross-bar B and tongue D at their point of intersection. F are the wheels which revolve upon the journals of the axles G, which work in bearings H. The bearings H are notched or grooved upon their upper sides to receive and fit upon the lower edges of the side bars A, to which bars they are secured by bolts, several holes being formed in said side bars to receive the said bolts, so that the position of the wheels may be adjusted as may be required. At the inner side of the side bars A the axles G are bent at right angles, extend back to or nearly to the rear ends of the side bars A, are bent inward at right angles, extend inward till they nearly meet, and are bent to the rearward at right angle, space being left between the rearwardly-projecting ends of the said axles, to receive the bar I, to which the seat is attached, between them, and to which they are securely bolted. The rear parts of the axles G are connected and strengthened by a bar, $g^1$, securely bolted to them, as shown in Fig. 1. To the side parts of the axles G are attached or upon them are formed hooks $g^2$, to hook upon the upper edges of the side bars A, and thus support the driver's seat and its occupant. By this construction, by crossing the plow-handles or carrying them over to opposite corners of the frame, the axle G $g^1$ $g^2$ can be turned over forward, leaving the rear part of the frame entirely unobstructed, so that the machine may be used as a walking cultivator when desired.

Having thus described my invention, I claim as new and desire to secure by Letters Patent—

The combination of the adjustable bearings H and axle G $g^1$, provided with a bar, I, to receive the seat, and with supporting-hooks $g^2$, with the perforated side bars A, the cross-bars B C, the tongue D, the braces E, and the wheels F, substantially as herein shown and described.

WILLIAM M. COSTON.

Witnesses:
JOHN EDWARDS,
WM. B. ROSEBERRY.